United States Patent [19]
Carruthers

[11] Patent Number: 5,800,109
[45] Date of Patent: Sep. 1, 1998

[54] IMPROVED FASTENER WITH A TAPERED SECTION AND A SLOT

[75] Inventor: Philip D. Carruthers, Austin, Tex.

[73] Assignee: Amifast Corporation, Austin, Tex.

[21] Appl. No.: 855,439

[22] Filed: May 13, 1997

[51] Int. Cl.⁶ .......................... F16B 15/08; F16B 19/00
[52] U.S. Cl. ...................... 411/510; 411/455; 411/913; 411/908
[58] Field of Search ....................... 411/508, 509, 411/510, 907, 908, 913, 455; 24/297

[56] References Cited

U.S. PATENT DOCUMENTS

| | | |
|---|---|---|
| D. 293,880 | 1/1988 | Takahashi . |
| D. 347,381 | 5/1994 | Carruthers ............................. D8/382 |
| D. 347,382 | 5/1994 | Carruthers ............................. D8/382 |
| D. 347,383 | 5/1994 | Carruthers ............................. D8/382 |
| D. 347,786 | 6/1994 | Carruthers ............................. D8/382 |
| 2,990,739 | 7/1961 | Zifferer . |
| 3,022,701 | 2/1962 | Potruch . |
| 3,088,361 | 5/1963 | Hallock ............................... 52/512 |
| 3,107,570 | 10/1963 | Zifferer et al. . |
| 3,172,123 | 3/1965 | Helderman et al. . |
| 3,214,875 | 11/1965 | Slowinski et al. . |
| 3,216,875 | 11/1965 | James et al. . |
| 3,466,966 | 9/1969 | Brown . |
| 3,474,700 | 10/1969 | Helderman . |
| 3,483,787 | 12/1969 | Saunders . |
| 3,494,018 | 2/1970 | Helderman et al. . |
| 3,547,333 | 12/1970 | Helderman . |
| 3,613,497 | 10/1971 | Helderman . |
| 3,665,583 | 5/1972 | Helderman . |
| 3,742,809 | 7/1973 | Zifferer . |
| 3,805,472 | 4/1974 | Helderman . |
| 3,810,279 | 5/1974 | Swick et al. ........................ 411/509 |
| 3,905,570 | 9/1975 | Nieuwveld ....................... 411/913 X |
| 4,138,921 | 2/1979 | McGauran et al. ................. 411/510 |
| 4,233,878 | 11/1980 | McGauran et al. ................. 411/510 |
| 4,381,633 | 5/1983 | MacLeod . |
| 4,462,194 | 7/1984 | Wahner ................................ 52/512 |
| 4,759,670 | 7/1988 | Linder et al. . |
| 4,883,396 | 11/1989 | Shamah et al. . |
| 5,061,137 | 10/1991 | Gourd ................................ 411/510 |
| 5,195,859 | 3/1993 | Thornton, Jr. ..................... 411/510 |
| 5,306,098 | 4/1994 | Lewis ................................ 411/510 |

FOREIGN PATENT DOCUMENTS

| | | | |
|---|---|---|---|
| 3272308 | 12/1991 | Japan ................................. 411/913 |
| 821902 | 10/1959 | United Kingdom .................. 24/297 |

*Primary Examiner*—Neill R. Wilson
*Attorney, Agent, or Firm*—Arnold, White & Durkee

[57] ABSTRACT

The present invention provides fasteners that have surprising benefits, such as the ability to be set into a fixing hole by gentle pressure, for example thumb pressure, and remain in place without holding until hammered fully home, and the ability to maintain the proper alignment upon hammering. Also provided are methods of attaching one object to another object, using the instant fasteners.

20 Claims, 11 Drawing Sheets

1

IMPROVED FASTENER WITH A TAPERED SECTION AND A SLOT

BACKGROUND OF THE INVENTION

1. Field of the Invention

The present invention relates generally to the fields of fasteners. More particularly, it concerns improved fasteners with surprising benefits.

2. Description of Related Art

Many fasteners are known in the art that are capable of attaching one object to another, for example attaching a wall panel to a hard substrate. Examples of fasteners include the fasteners described by the inventor in U. S. Design Pat. Nos. Des. 347,381, Des. 347,382, Des. 347,383 and Des. 347, 786. Specifically, FIGS. 1–3 of each of the above referenced U.S. Design Patents show fasteners having a head, an untapered shaft and a plurality of fins which define four continuous channels. Additionally, the fasteners of U.S. Design Pat. Nos. Des. 347,381 and Des. 347,786 show fasteners that further comprise a shank that defines four troughs that are aligned with the channels defined by the fins.

However, the prior art fasteners have at least two shortcomings. First, the fasteners need to be held in place in the fixing hole while setting them, for example by hammering. Second, the prior art fasteners have a tendency to become misaligned during hammering, which upon further hammering may cause complete failure of the fastener. Thus there is a need in the art for an improved fastener.

A fastener that could be set into a fixing hole by gentle pressure and remain in place without holding until it could be hammered fully home would have significant benefits. And a fastener that is able to maintain the proper alignment upon hammering would also represent a significant advance in the art.

SUMMARY OF THE INVENTION

Applicant has discovered improved fasteners which have these surprising benefits lacking from fasteners described in the prior art. The fasteners of the present invention may be set into a fixing hole by gentle pressure, for example thumb pressure, and remain in place without holding until it can be hammered fully home. And the instant fasteners are able to maintain the proper alignment upon hammering, thus representing a significant advance in the art.

The present invention provides a fastener comprising a head, a shaft or body having a first end and a second end, the first end of the shaft operably connected to the head, the shaft comprising a tapered section and an untapered section, and a fin attached to the shaft. Such fins may have a generally trapezoidal cross-section, or any other cross-section that fulfills the function of the fin. In certain aspects of the present invention, the fin has a generally trapezoidal cross-section. In further embodiments, the top, or longest, edge of the trapezoid is generally disposed nearer to the head than the bottom, or shorter, edge of the trapezoid. In particular aspects of the instant invention, the tapered section generally comprises one-tenth, one-eighth, one-seventh, one-sixth, one-fifth, one-fourth, one third, one-half, three-fifths, two-thirds, three-quarters or four-fifths or so of the length of the shaft. In still further embodiments of the present invention, the tapered section comprises substantially the full length of the shaft.

In one aspect of the invention, the second end of the shaft of the fastener defines at least a first slot. In certain aspects of the present invention, the second end of the shaft of the fastener defines at least a first slot and a second slot. In one embodiment of the invention, the slot extends through the fin. In another embodiment of the invention, the fin defines at least a first channel. In a particular aspect of the invention, the channel is defined in a plane perpendicular to the slot when the fastener is viewed from the second end of the shaft. In a further embodiment of the present invention, the fin defines at least a first channel and at least a second channel. In still further aspects of the present invention, the fin may define three or four channels.

In a further aspect of the invention, a plurality of fins are attached to the shaft of the fastener. In certain aspects of the present invention, the top, or longer, edge of the trapezoidal cross-section of the fins are generally perpendicular (about 90°) in relation to the shaft. In other aspects, the top, or longer, edge of the trapezoidal cross-section of the fins may define an angle of generally greater than 90°, while in alternate embodiments the top, or longer, edge of the trapezoidal cross-section of the fins may define an angle of generally less than 90° in relation to the shaft. In particular embodiments, the top, or longer, edge of the trapezoidal cross-section of the fins may define an angle of about 5°, about 10°, about 20°, about 30°, about 45°, about 60°, about 75°, about 80°, about 100°, about 110°, about 120°, about 135°, about 150°, about 160° or about 170° in relation to the shaft.

In a particular embodiment of the invention, the slot extends from the second end of the shaft through at least one fin. In an additional embodiment of the invention, the slot extends through more than 1 fin. In one embodiment of the invention, a plurality of fins extends substantially from the first end of the shaft to the second end of the shaft. In a further embodiment of the present invention, the plurality of fins defines a continuous channel.

In another embodiment of the invention, the fastener further comprises a shank, the shank having a first end and a second end, the first end of the shank operably connected to the head, and the second end of the shank operably connected to the shaft. In one aspect of the invention, the shank defines a trough. In certain embodiments of the present invention, the trough is aligned with the channel defined by the fins. In another aspect of the invention, the shank defines a plurality of troughs. In a further aspect of the present invention, the plurality of troughs are aligned with the plurality of channels defined by the fins. In a further aspect of the invention, the trough extends substantially from the first end of the shank to the second end of the shank.

In particular aspects of the invention, the fastener is composed of a polymer. In certain embodiments, the polymer is a thermoplastic polymer. The thermoplastic polymers contemplated for use in the present invention include, but are not limited to, acetal polymers, acrylonitrile butadiene styrene, polyphenylene oxide, polyurethane, thermoplastic polyester, ultra high molecular weight polyethylene, low density polyethylene, high density polyethylene, polyethylenes and co-polymers, polypropylene, polyamides, polyimides, filled nylon resins, unfilled nylon resins, polycarbonate, polyvinylchlorides and their polymers, silicones and derivatives thereof, or any combination of one or more of the above materials. In a preferred embodiment of the invention, the fastener is composed of nylon.

In certain embodiments of the present invention, the head has a generally rectangular transverse cross-section. In additional embodiments of the invention, the head has a generally trapezoidal transverse cross-section.

The present invention also provides an improved fastener having a head, a shaft having a first end and a second end, the first end of the shaft attached to the head, and a plurality of fins attached to the shaft, wherein the improvement comprises the shaft comprising a tapered section and an untapered section. In a particular aspect of the invention, the improvement further comprises the second end of the shaft defining a slot.

The present invention additionally provides a method of attaching a first object to a second object, which may comprise the steps of positioning the first object in operable relation to the second object, and attaching the first object to the second object using a fastener comprising a head, a shaft having a first end and a second end, the first end of the shaft attached to the head, the shaft comprising a tapered section and an untapered section, and at least a first fin attached to the shaft. In a further aspect of the invention, the second end of the shaft of the fastener defines a slot.

In another embodiment of the invention, the first object and the second object each define a hole having a diameter less than the fastener, and wherein the first object is attached to the second object by aligning the holes and inserting the fastener into the holes.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

FIG. 1A is a longitudinal view of the fastener, shown in the plane where the slot is visible. FIG. 1B is a longitudinal view rotated 90° from the view in FIG. 1A, shown in the plane where the channel is visible. FIG. 1C is a transverse cross-sectional view of the fastener shown along section line A—A of FIG. 1A. FIG. 1D is a transverse cross-sectional view of the fastener shown along section line B—B of FIG. 1A. FIG. 1E is a transverse cross-sectional view of the fastener shown along section line C—C of FIG. 1A.

FIG. 2A is a longitudinal view of the fastener, shown in the plane where the slot is visible. FIG. 2B is a longitudinal view rotated 90° from the view in FIG. 2A, shown in the plane where the channel is visible.

FIG. 3A is a longitudinal view of the fastener, shown in the plane where the slot is visible. FIG. 3B is a longitudinal view rotated 90° from the view in FIG. 3A, shown in the plane where the channel is visible.

DESCRIPTION OF ILLUSTRATIVE EMBODIMENTS

In a most general aspect, the present invention comprises a device for fastening one object to another object. Presently preferred embodiments are shown in FIGS. 1 through 5.

Figure 1A:
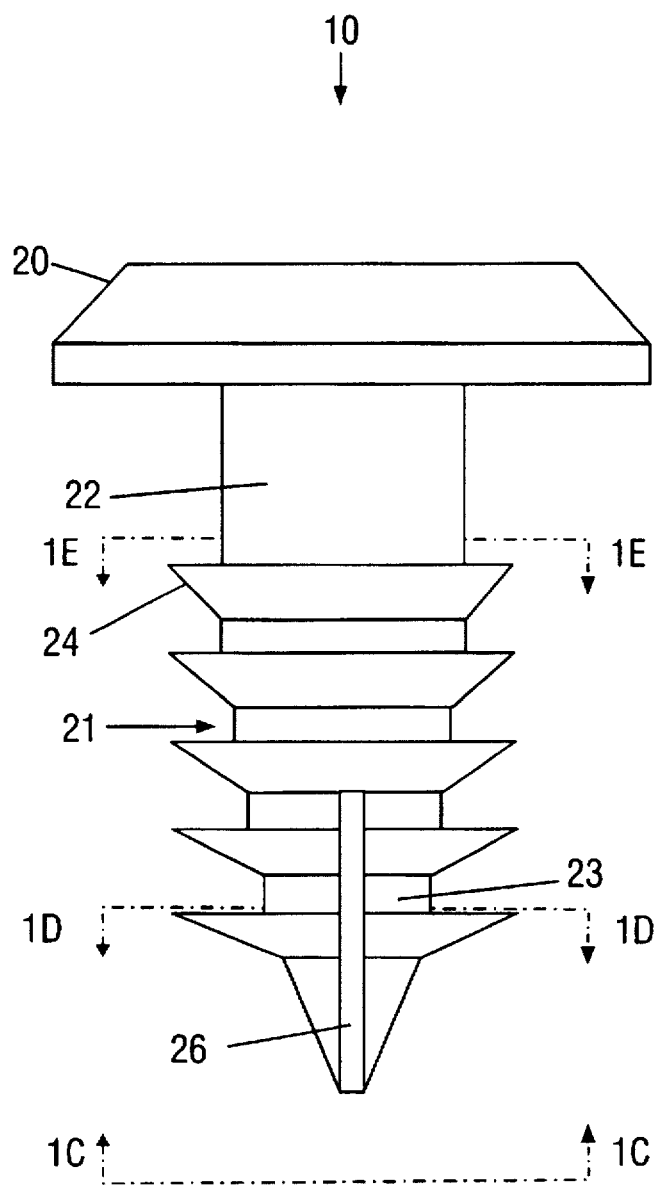
FIG. 1A, FIG. 1B, FIG. 1C, FIG. 1D and FIG. 1E illustrate one exemplary embodiment of a fastener.
Figure 1B:
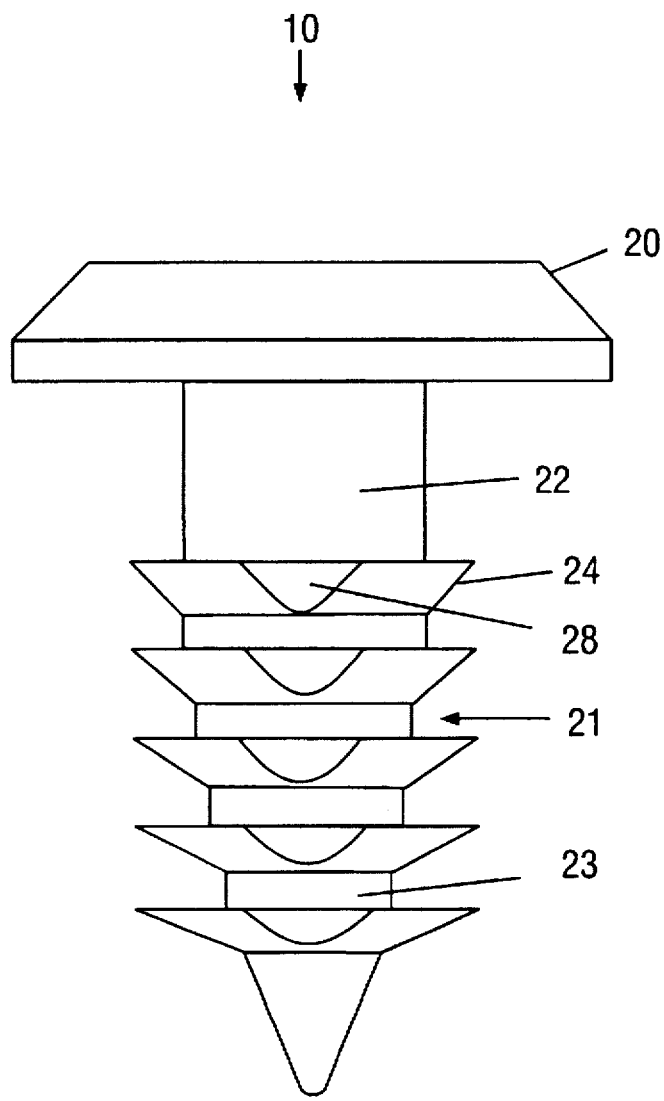
Figure 1C:
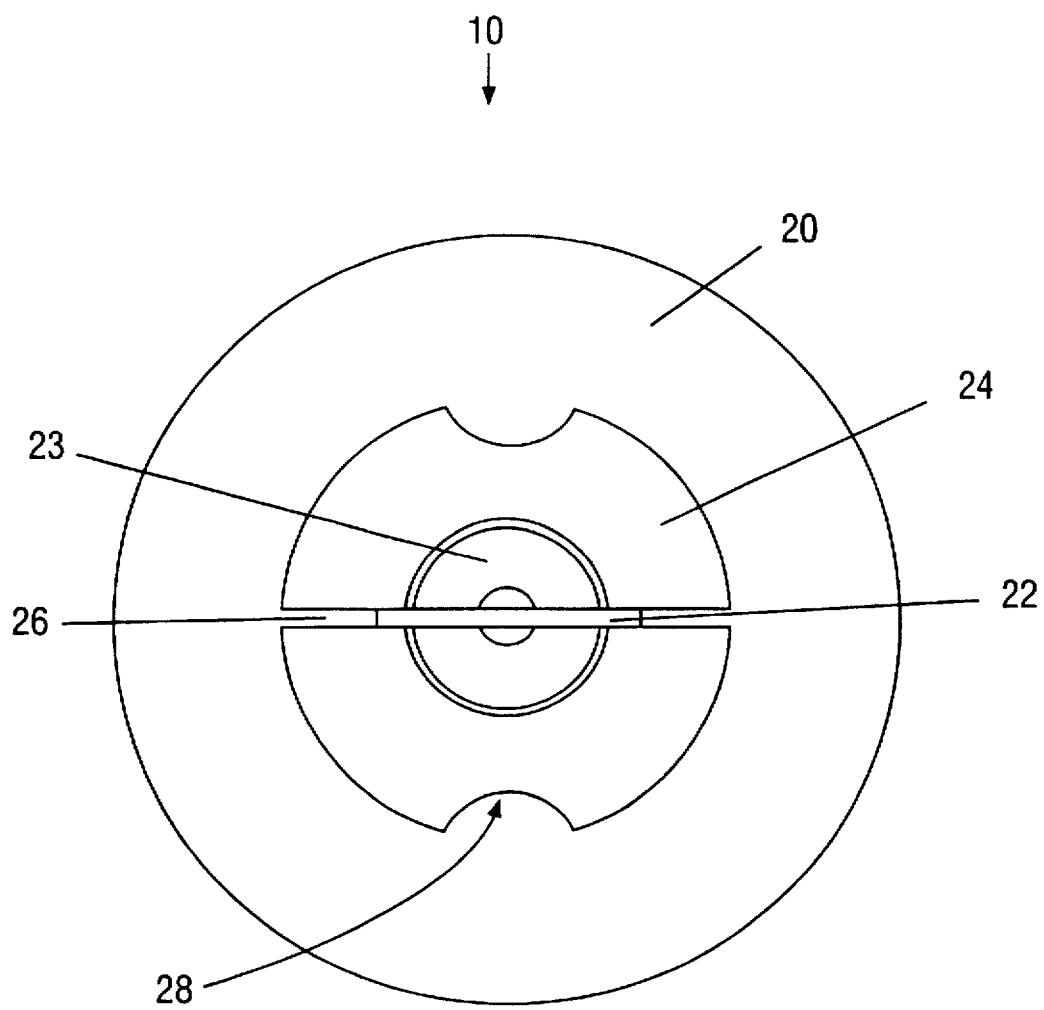
Figure 1D:
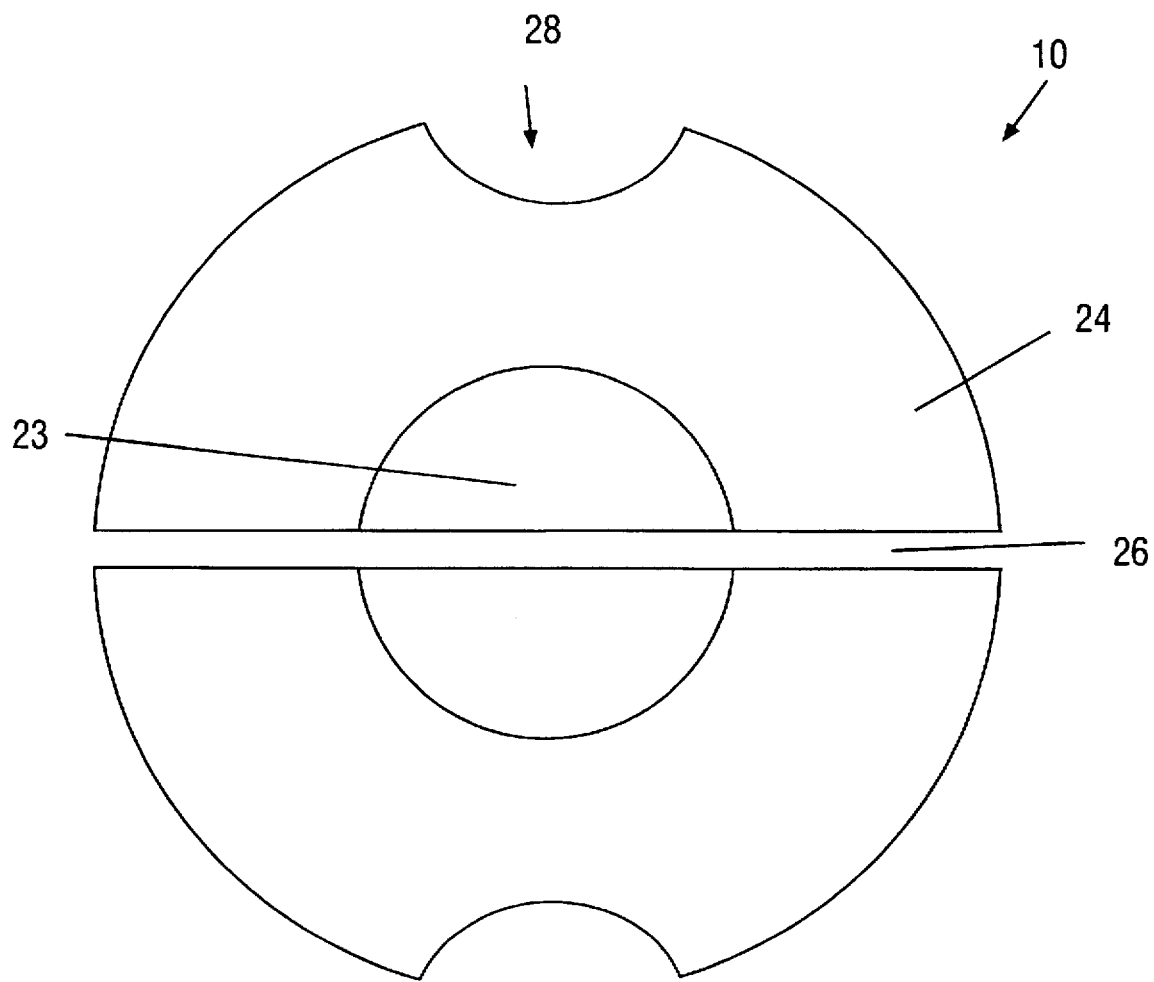
Figure 1E:
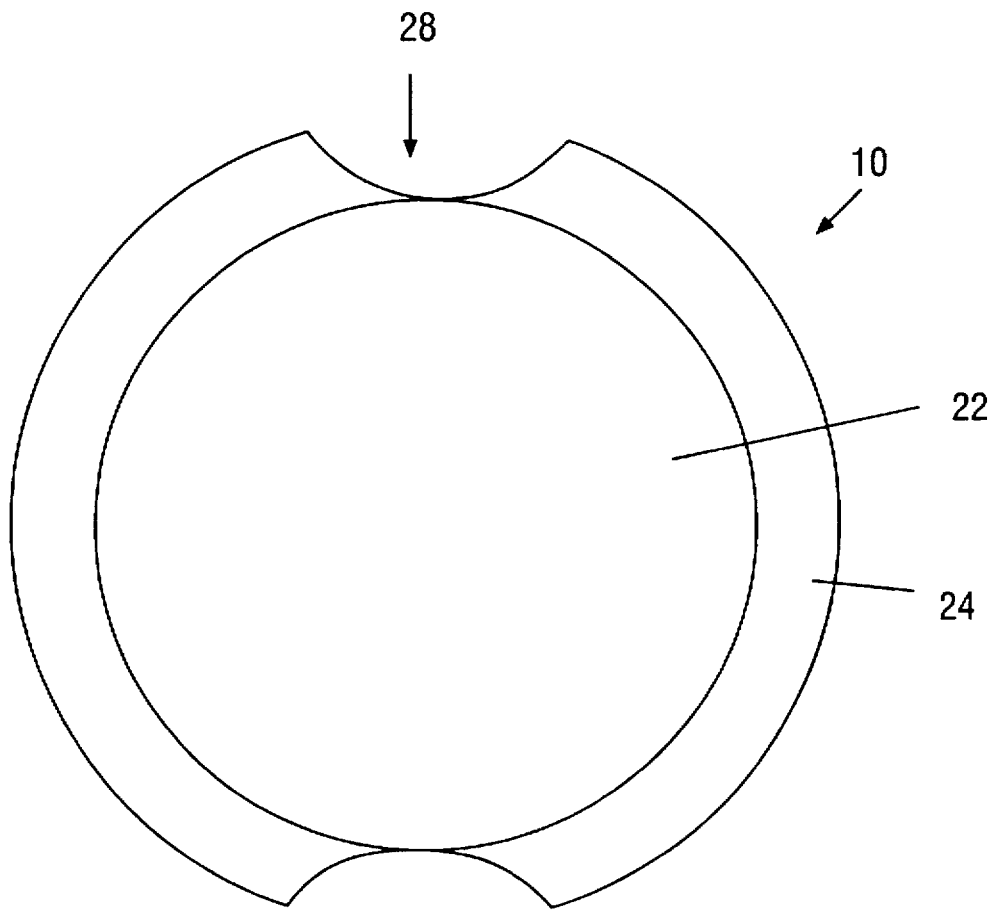

FIG. 1A, FIG. 1B, FIG. 1C, FIG. 1D and FIG. 1E illustrate one exemplary embodiment of a fastener. FIG. 1A is a longitudinal view of fastener 10. In this embodiment, fastener 10 comprises head 20, fins 24 and shaft 21. The shaft 21 comprises a tapered section 23 and an untapered section 22. This view of fastener 10 is shown in the plane wherein slot 26 is visible, and extends through two of fins 24. FIG. 1B is a longitudinal view of fastener 10 rotated 90° from the view in FIG. 1A, showing head 20, fins 24, and shaft 21 comprising a tapered section 23 and an untapered section 22. This view of fastener 10 is shown in the plane wherein channel 28 defined by fins 24 is visible. FIG. 1C is a transverse cross-sectional view of fastener 10 shown along section line A—A of FIG. 1A, showing head 20, fin 24, tapered section 23, untapered section 22, slot 26 and channels 28 defined by fin 24. FIG. 1D is a transverse cross-sectional view of fastener 10 shown along section line B—B of FIG. 1A, showing fin 24, tapered section 23, slot 26 and channels 28 defined by fin 24. FIG. 1E is a transverse cross-sectional view of fastener 10 shown along section line C—C of FIG. 1A, showing fin 24, untapered section 22 and channels 28 defined by fin 24.

Figure 2A:
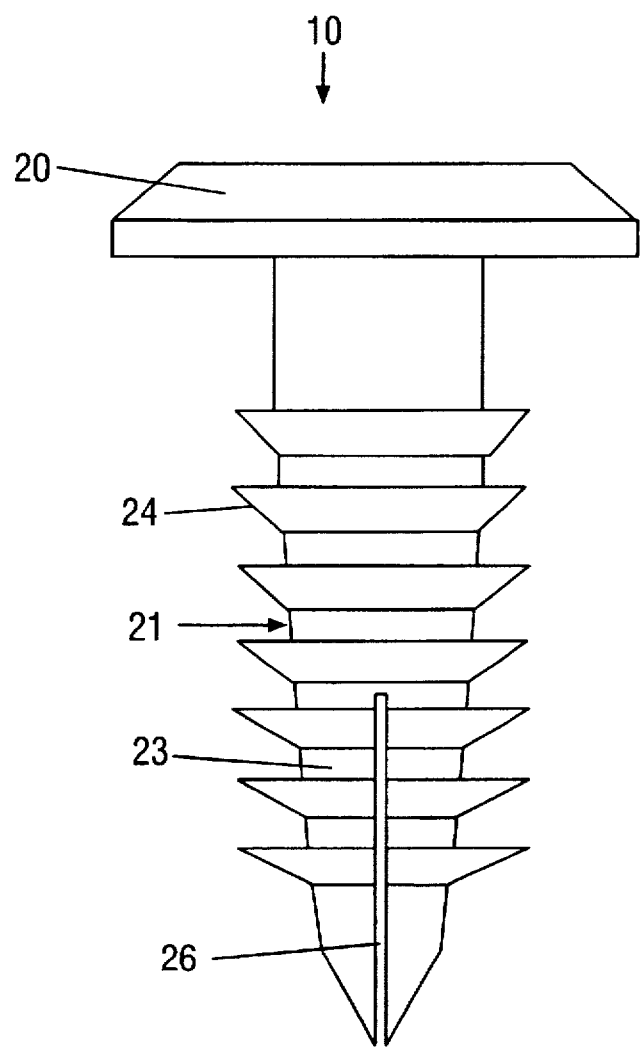
FIG. 2A and FIG. 2B illustrate an exemplary embodiment of a fastener having a longer slot.
Figure 2B:
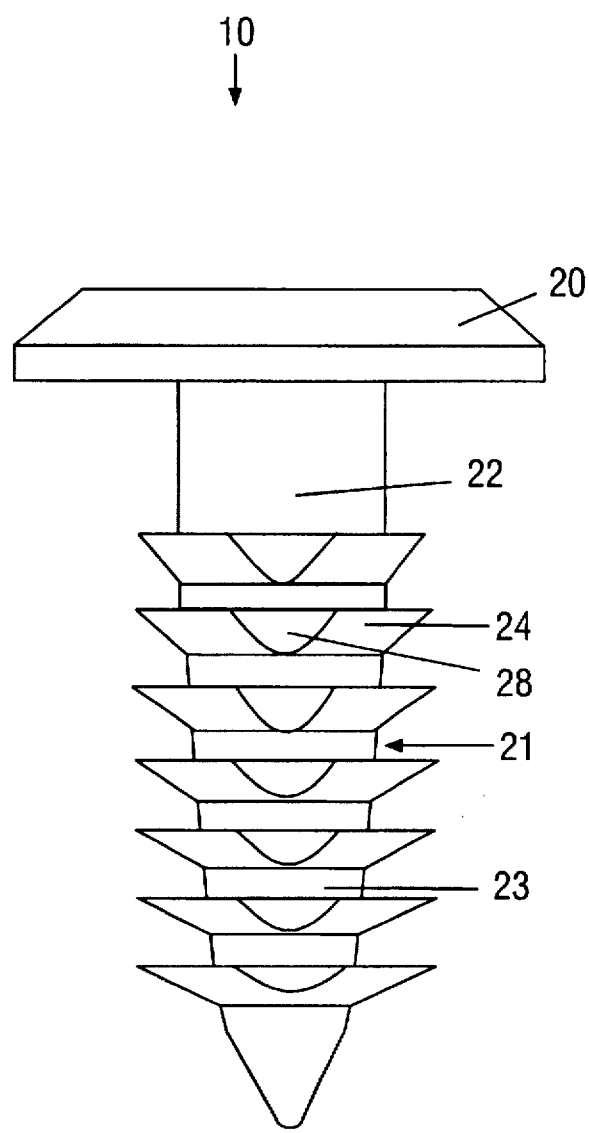

FIG. 2A and FIG. 2B illustrate an alternate embodiment of a fastener. FIG. 2A is a longitudinal view of fastener 10. In this embodiment, fastener 10 comprises head 20, fins 24 and shaft 21. Shaft 21 comprises a tapered section 23 and an untapered section 22. This view of fastener 10 is shown in the plane wherein slot 26 is visible, and extends through three of fins 24. FIG. 2B is a longitudinal view of fastener 10 rotated 90° from the view in FIG. 2A, showing head 20, fins 24 and shaft 21 comprising a tapered section 23 and an untapered section 22. FIG. 2B is shown in the plane wherein channel 28 defined by fins 24 is visible.

Figure 3A:
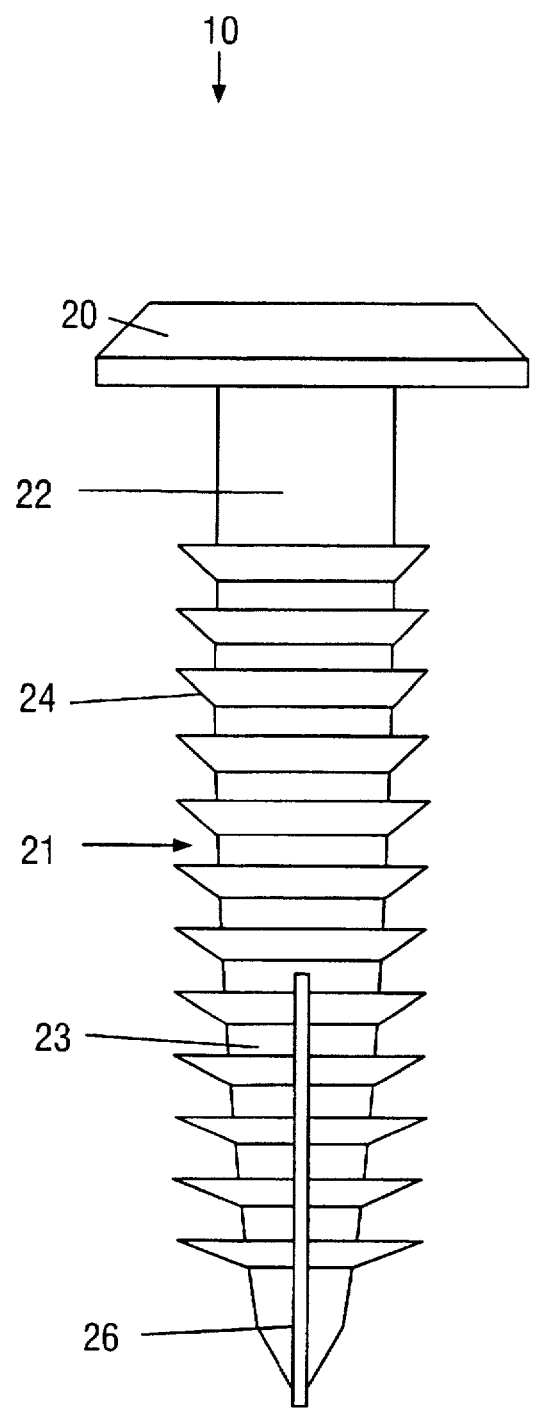
FIG. 3A and FIG. 3B illustrates another exemplary embodiment of a fastener having a longer slot.
Figure 3B:
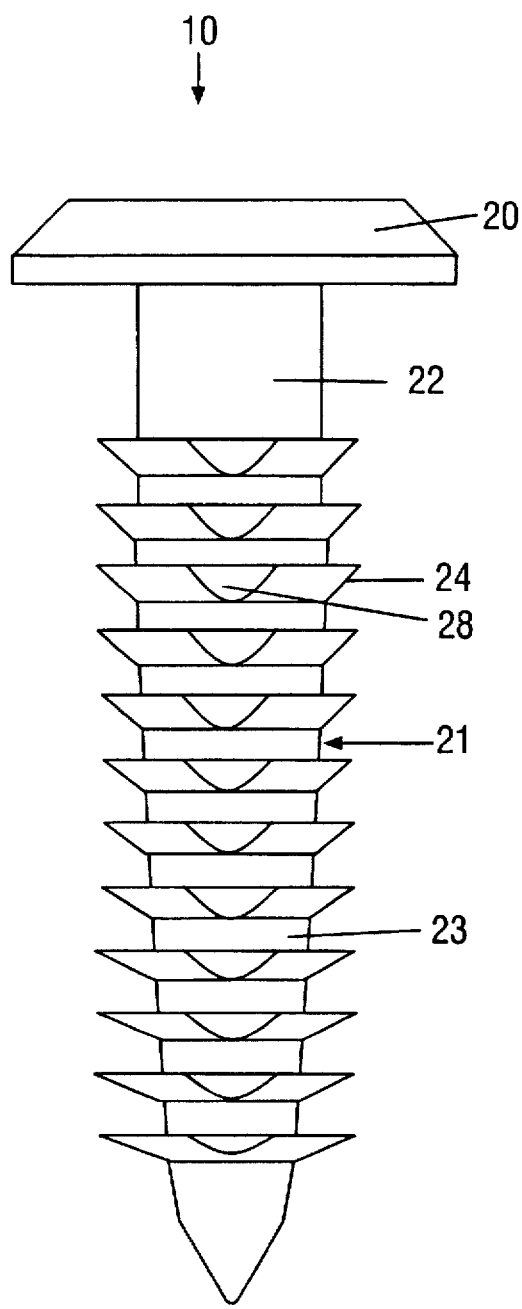

FIG. 3A and FIG. 3B illustrates another embodiment of a fastener. FIG. 3A is a longitudinal view of fastener 10. In this embodiment, fastener 10 comprises head 20, fins 24 and shaft 21. Shaft 21 comprises a tapered section 23 and an untapered section 22. This view of fastener 10 is shown in the plane wherein slot 26 is visible, and extends through five of fins 24. FIG. 3B is a longitudinal view of fastener 10, rotated 90° from the view in FIG. 3A, showing head 20, fins 24 and shaft 21 comprising a tapered section 23 and an untapered section 22. FIG. 3B is shown in the plane wherein channel 28 defined by fins 24 is visible.

Figure 4:
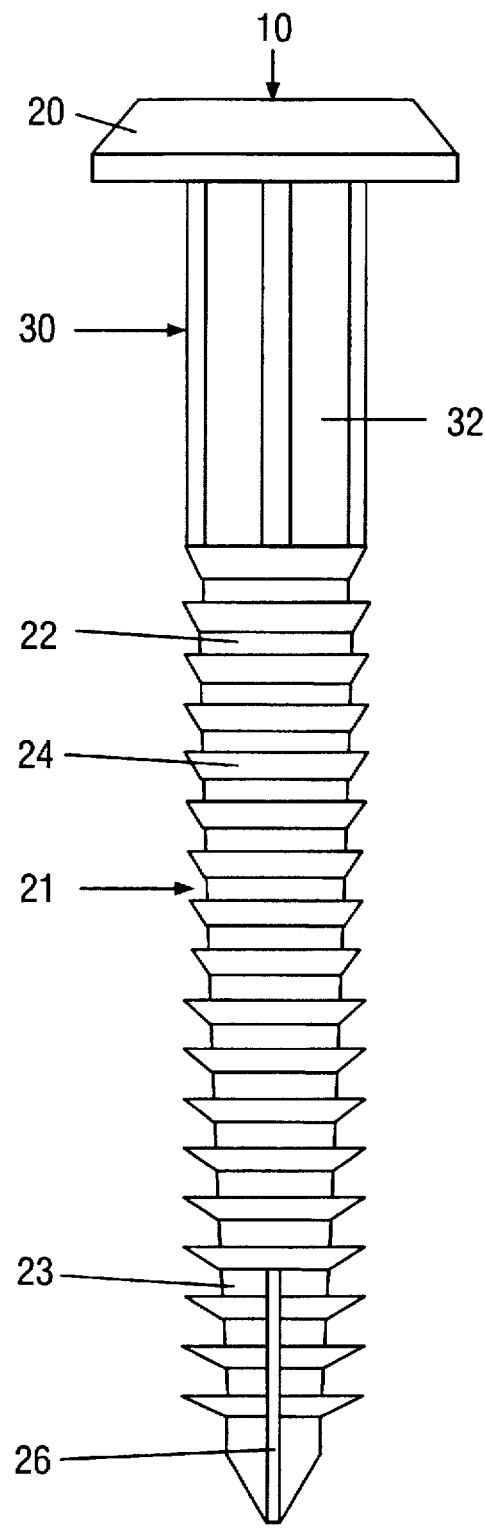
FIG. 4 is a longitudinal view of an exemplary embodiment of a fastener having a shank, with the shank defining a plurality of troughs.

FIG. 4 is a longitudinal view of an alternate embodiment of a fastener. In this embodiment, fastener 10 comprises head 20, fins 24 and shaft 21. Shaft 21 comprises a tapered section 23 and an untapered section 22. This view of fastener 10 is shown in the plane wherein slot 26 is visible, and extends through three of fins 24. Fastener 10 further comprises shank 30, which defines a plurality of troughs 32.

Figure 5:
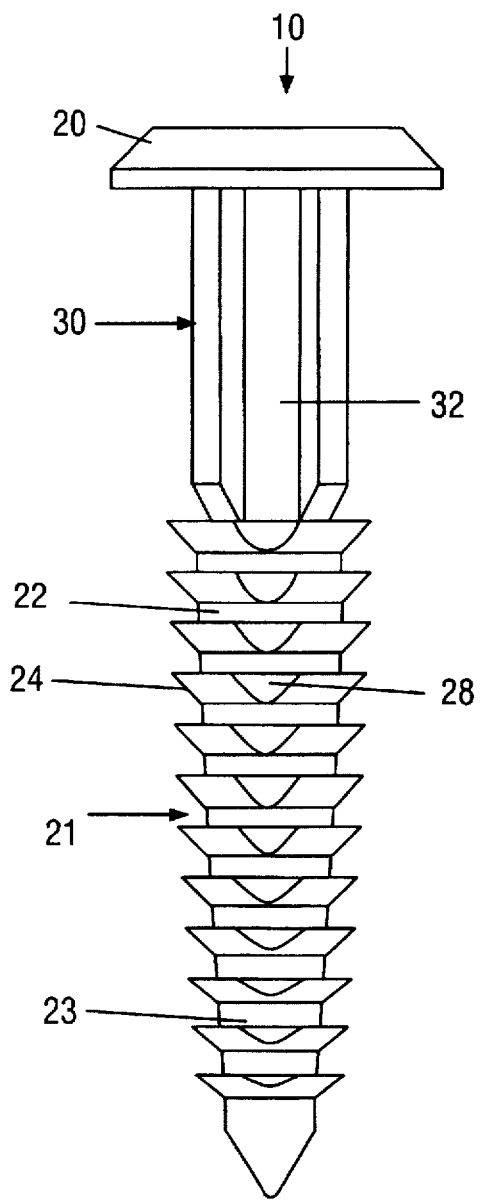
FIG. 5 is a longitudinal view of another exemplary embodiment of a fastener having a shank, with the shank defining a trough that is aligned with the channel defined by the fins.

FIG. 5 is a longitudinal view of another exemplary embodiment of a fastener. In this embodiment, fastener 10 comprises head 20, fins 24 and shaft 21. Shaft 21 comprises a tapered section 23 and an untapered section 22. This view of fastener 10 is shown in the plane wherein channel 28 defined by fins 24 is visible. Fastener 10 further comprises shank 30, which defines a trough 32 that is aligned with channel 28.

The following example is included to demonstrate preferred embodiments of the invention. It should be appreciated by those of skill in the art that the techniques disclosed in the example which follows represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

An exemplary, but in no way limiting, method of producing the fasteners of the present invention is detailed below. In this method, the fastener is produced by an industrial process known as injection molding. In this process, the desired thermoplastic compound or compounds are liquefied by heating, and are then propelled, or injected, under high pressure into a mold. The mold is typically machined from steel and contains cavities, or impressions, that are the reverse or mirror image of the item being molded. The liquefied thermoplastic material, having been forced into the cavities within the mold, is allowed to cool and become solidified. At this point, the molded fasteners are ejected from the mold and sent to the next stage of production, where they are trimmed of excess material, known as mold flash. The fastener is then treated by a process similar to the annealing of metals, to enable the thermoplastic material to develop its ultimate mechanical properties.

Examples of the dimensions of the fastener thus produced are shown below. The dimensions listed are exemplary only, and not intended as a limitation to any or all of the dimensions of the individual components of the instant fasteners. The fastener may have a head that is $5/8$ of an inch in diameter or larger at the base, $7/16$ of an inch in diameter or larger at the crown and may have a height of $1/8$ of an inch or more. The shaft may generally be $1/4$ of an inch in diameter in the untapered section. Other exemplary diameters of the untapered section of the instant fasteners include about $1/3$ of an inch, about $3/8$ of an inch, about $1/2$ of an inch, about $5/8$ of an inch, about $2/3$ of an inch, about $3/4$ of an inch, about $7/8$ of an inch or about one inch or larger.

The untapered section may vary from about $1/4$ of an inch or so in length to about $3/4$ of an inch, about 1 inch, about 1 and $1/2$ inches, about 2 inches or about 4 inches or longer in length. The tapered section may vary from about $1/8$ of an inch or so in length to about $5/8$ of an inch or about 1 inch or longer in length. The length of the shaft can vary in overall length from $3/4$ of an inch or so to 6 inches or longer. The fins may be $5/16$ of an inch in diameter and $1/16$ of an inch in width, and the spacing between the tips of the fins may be $3/32$ of an inch. The number of fins can vary from 5 or so to as many as 17 or more. The distance from the tip of the lowest fin to the tapered end of the shaft can vary from $3/16$ of an inch or so to $1/4$ of an inch or more. Two channels may be defined on opposite sides the fins, and may be described as cutaways formed by a circle that may generally be $1/8$ of an inch in diameter with the center of the circle $7/32$ of an inch or so from the center of the shaft. The slot may be $1/32$ of an inch in width, and can vary in overall length from $5/16$ of an inch or so to $7/16$ of an inch or longer.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A fastener comprising:
   (a) a head;
   (b) a shaft having a first end and a second end, said first end of said shaft operably connected to said head, said second end of said shaft defining at least a first slot said shaft comprising a tapered section and an untapered section; and
   (c) a fin attached to said shaft, said fin defining at least a first channel.

2. The fastener of claim 1, wherein said second end of said shaft further defines at least a second slot.

3. The fastener of claim 1, wherein said slot extends through said fin.

4. The fastener of claim 1, wherein said fin further defines at least a second channel.

5. The fastener of claim 1, comprising a plurality of fins attached to said shaft.

6. The fastener of claim 5, wherein said slot extends from said second end of said shaft through at least one fin.

7. The fastener of claim 5, wherein said slot extends through more than 1 fin.

8. The fastener of claim 5, wherein said plurality of fins extends substantially from said first end of said shaft to said second end of said shaft.

9. The fastener of claim 1, wherein said channel is defined in a plane perpendicular to said slot when said fastener is viewed from said second end of said shaft.

10. The fastener of claim 1, further comprising a shank, said shank having a first end and a second end, said first end of said shank operably connected to said head, and said second end of said shank operably connected to said shaft.

11. The fastener of claim 10, wherein said shank defines a trough.

12. The fastener of claim 11, wherein said shank defines a plurality of troughs.

13. The fastener of claim 11, wherein said trough extends substantially from said first end of said shank to said second end of said shank.

14. The fastener of claim 1, where in said fastener is composed of a polymer.

15. The fastener of claim 14, wherein said fastener is composed of nylon.

16. An improved fastener having a head, a shaft having a first end and a second end, said first end of said shaft attached to said head, and a plurality of fins attached to said shaft, wherein the improvement comprises said second end of said shaft defining at least a first slot, said plurality of fins defining at least a first channel, and said shaft comprising a tapered section and an untapered section.

17. The improved fastener of claim 16, wherein the improvement further comprises said second end of said shaft defining at least a second slot.

18. A method of attaching a first object to a second object, comprising the steps of:
   (a) positioning said first object in operable relation to said second object; and (b) attaching said first object to said second object using a fastener comprising:
  (i) a head;
  (ii) a shaft having a first end and a second end, said first end of said shaft operably attached to said head, said second end of said shaft defining at least a first slot, said shaft comprising a tapered section and an untapered section; and
  (iii) at least a first fin attached to said shaft, said fin defining at least a first channel.

19. The method of claim 18, wherein said second end of said shaft of said fastener further defines at least a second slot.

20. The method of claim 18, wherein said first object and said second object each define a hole having a diameter less than said fastener, and wherein said first object is attached to said second object by aligning said holes and inserting said fastener into said holes.

* * * * *